US012677132B2

(12) United States Patent
Xing

(10) Patent No.: US 12,677,132 B2
(45) Date of Patent: Jul. 7, 2026

(54) METHOD FOR TERMINAL CONFIGURATION, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Jinqiang Xing, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 774 days.

(21) Appl. No.: 18/146,518

(22) Filed: Dec. 27, 2022

(65) Prior Publication Data

US 2023/0224691 A1 Jul. 13, 2023

Related U.S. Application Data

(63) Continuation of application No. PCT/CN2020/121699, filed on Oct. 16, 2020.

(51) Int. Cl.
*H04W 8/18* (2009.01)
*H04W 8/22* (2009.01)

(52) U.S. Cl.
CPC ............. *H04W 8/183* (2013.01); *H04W 8/22* (2013.01)

(58) Field of Classification Search
None
See application file for complete search history.

(56) References Cited

U.S. PATENT DOCUMENTS

2016/0157228 A1* 6/2016 Yum ..................... H04L 5/0007
370/329
2021/0105596 A1* 4/2021 Prabhakar ............... H04W 4/50

FOREIGN PATENT DOCUMENTS

| CN | 102291711 | 12/2011 |
|----|-----------|---------|
| CN | 103209403 | 7/2013 |
| CN | 110430564 | 11/2019 |
| CN | 110933746 | 3/2020 |
| EP | 3579594 | 12/2019 |
| WO | 2015168029 | 11/2015 |

OTHER PUBLICATIONS

"3rd Generation Partnership Project; Technical Specification Group Radio Access Network; NR; User Equipment (UE) radio access capabilities (Release 16)," 3GPP TS 38.306, Jul. 2020, v16.1.0.
(Continued)

*Primary Examiner* — Robert M Morlan
(74) *Attorney, Agent, or Firm* — Hodgson Russ LLP

(57) ABSTRACT

A method for terminal configuration, a terminal device, and a network device are provided in the disclosure. The method for terminal configuration includes the following. The network device receives at least two sets of communication capabilities reported by a terminal device in an initial access procedure of the terminal device. The network device receives capability indication information transmitted by the terminal device, where the capability indication information indicates the network device to perform terminal configuration according to a first set of communication capabilities among the at least two sets of communication capabilities. The network device performs the terminal configuration according to the first set of communication capabilities.

17 Claims, 12 Drawing Sheets

RECEIVE, BY THE NETWORK DEVICE, AT LEAST TWO SETS OF COMMUNICATION CAPABILITIES REPORTED BY A TERMINAL DEVICE IN AN INITIAL ACCESS PROCEDURE OF THE TERMINAL DEVICE — S201

RECEIVE, BY THE NETWORK DEVICE, CAPABILITY INDICATION INFORMATION TRANSMITTED BY THE TERMINAL DEVICE, WHERE THE CAPABILITY INDICATION INFORMATION INDICATES THE NETWORK DEVICE TO PERFORM TERMINAL CONFIGURATION ACCORDING TO A FIRST SET OF COMMUNICATION CAPABILITIES AMONG THE AT LEAST TWO SETS OF COMMUNICATION CAPABILITIES — S202

PERFORM, BY THE NETWORK DEVICE, THE TERMINAL CONFIGURATION ACCORDING TO THE FIRST SET OF COMMUNICATION CAPABILITIES — S203

(56) References Cited

OTHER PUBLICATIONS

Wipo, International Search Report and Written Opinion for International Application No. PCT/CN2020/121699, Jul. 21, 2021.
OPPO, "Discussion on UE capability for Full TX power UL transmission," 3GPP TSG-RAN WG4 Meeting #90, R4-1900266, Feb. 2019.
Huawei et al., "On intra-band CA UE capability," 3GPP TSG-RAN4 WG4 Meeting # 96-e, R4-2011473, Aug. 2020.
EPO, Extended European Search Report for EP Application No. 20957293.2, Nov. 9, 2023.

* cited by examiner

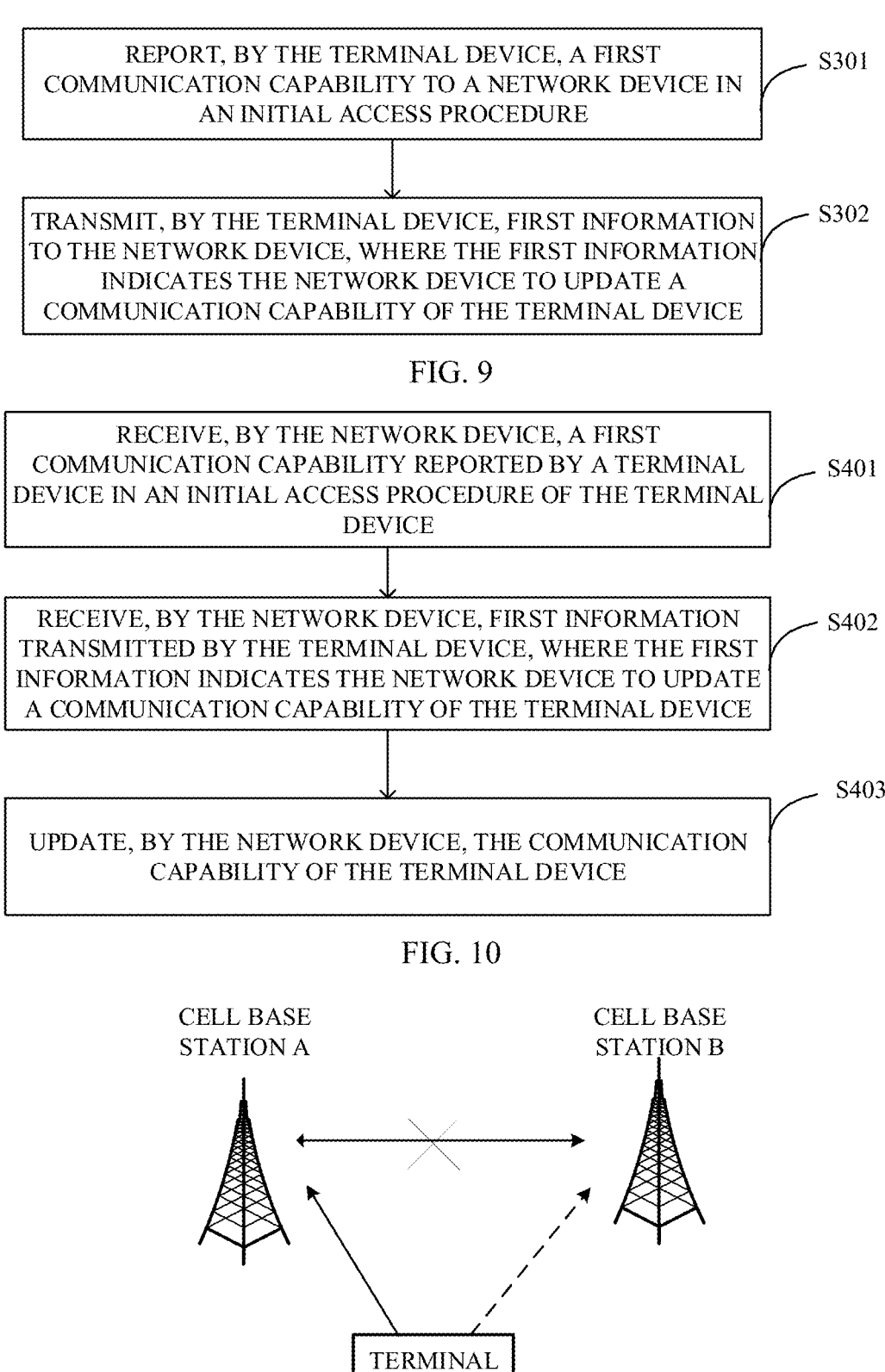

REPORT, BY THE TERMINAL DEVICE, A FIRST COMMUNICATION CAPABILITY TO A NETWORK DEVICE IN AN INITIAL ACCESS PROCEDURE — S301

TRANSMIT, BY THE TERMINAL DEVICE, FIRST INFORMATION TO THE NETWORK DEVICE, WHERE THE FIRST INFORMATION INDICATES THE NETWORK DEVICE TO UPDATE A COMMUNICATION CAPABILITY OF THE TERMINAL DEVICE — S302

FIG. 9

RECEIVE, BY THE NETWORK DEVICE, A FIRST COMMUNICATION CAPABILITY REPORTED BY A TERMINAL DEVICE IN AN INITIAL ACCESS PROCEDURE OF THE TERMINAL DEVICE — S401

RECEIVE, BY THE NETWORK DEVICE, FIRST INFORMATION TRANSMITTED BY THE TERMINAL DEVICE, WHERE THE FIRST INFORMATION INDICATES THE NETWORK DEVICE TO UPDATE A COMMUNICATION CAPABILITY OF THE TERMINAL DEVICE — S402

UPDATE, BY THE NETWORK DEVICE, THE COMMUNICATION CAPABILITY OF THE TERMINAL DEVICE — S403

FIG. 10

CELL BASE STATION A          CELL BASE STATION B

TERMINAL

FIG. 11

CELL BASE
STATION A

CELL BASE
STATION B

TERMINAL

TERMINAL                                              BASE STATION

THE TERMINAL REPORTS MULTIPLE SETS OF
CAPABILITIES

. . . .

THE TERMINAL INDICATES AN APPLICABLE
SET OF CAPABILITIES

THE NETWORK PERFORMS UE CONFIGURATION
ACCORDING TO THE CAPABILITIES OF THE TERMINAL

RFIC

23PA1 (BAND X, BAND Y)

LO1

23PA2 (BAND X, BAND Y)

LO2

TERMINAL                                          BASE STATION

THE TERMINAL REPORTS A SET OF PC2
CAPABILITIES WHEN TRANSMISSION IS PERFORMED
IN A SINGLE BAND AND A SET OF PC3 CAPABILITIES
WHEN TRANSMISSION IS PERFORMED IN MULTIPLE
BANDS

. . . .

THE TERMINAL INDICATES THAT PC3 OR PC2
CAPABILITY IS APPLICABLE

THE NETWORK PERFORMS UE CONFIGURATION
ACCORDING TO THE CAPABILITY OF THE TERMINAL

2 LAYER (BAND X)

2 LAYER (BAND Y)

INITIAL POWER CAPABILITY REPORTING          POWER CAPABILITY CHANGE

RECEPTION CAPABILITY CHANGE          INITIAL RECEPTION
                                     CAPABILITY REPORTING

COMMUNICATION SYSTEM 800

TERMINAL DEVICE — 810

NETWORK DEVICE — 820

METHOD FOR TERMINAL CONFIGURATION, TERMINAL DEVICE, AND NETWORK DEVICE

CROSS REFERENCE TO RELATED APPLICATION(S)

This application is a continuation of International Application No. PCT/CN2020/121699, filed Oct. 16, 2020, the entire disclosure of which is incorporated herein by reference.

TECHNICAL FIELD

This disclosure relates to the field of communication, and more particularly, to a method for terminal configuration, a terminal device, and a network device.

BACKGROUND

Terminals report their own communication capabilities to networks when initially accessing the networks, and the capability parameters remain unchanged during subsequent communication with the networks. Typical capability parameters of the terminal include, for example, a power class (PC), a multiple input multiple output (MIMO) capability, etc. The base station performs corresponding configuration according to the communication capability reported by the terminal, to ensure the normal establishment of a communication connection.

However, in fact, there may be various situations where an actual capability of the terminal does not match the capability reported, which results in the suboptimal performance of the terminal. For example, in a multi-cell simultaneous operating mode, the terminal reports to the network communication capabilities in bands for two cells respectively. For example, in cell 1, the terminal reports that two transmission paths are supported in band X, and in cell 2, the terminal reports that two transmission paths are supported in band X, where cell 1 and cell 2 belong to different operators. In fact, due to the limitation of hardware conditions of, for example, sharing the same power amplifier (PA) in a two-cell simultaneous operating mode, it is difficult to achieve a maximum of two transmission paths in the two cells simultaneously. It can be seen that, the network performs configuration according to only the capability reported by the terminal, as a result, a configuration parameter for the terminal may be inconsistent with the actual capability of the terminal, thereby affecting an actual performance of the terminal.

SUMMARY

A method for terminal configuration is provided in implementations of the disclosure. The method is applied to a network device and includes the following. The network device receives at least two sets of communication capabilities reported by a terminal device in an initial access procedure of the terminal device. The network device receives capability indication information transmitted by the terminal device, where the capability indication information indicates the network device to perform terminal configuration according to a first set of communication capabilities among the at least two sets of communication capabilities. The network device performs the terminal configuration according to the first set of communication capabilities.

A terminal device is provided in implementations of the disclosure. The terminal device includes a transceiver, a processor, and a memory, where the memory is configured to store computer programs, and the processor is configured to invoke and execute the computer programs stored in the memory to report at least two sets of communication capabilities to a network device in an initial access procedure, and cause the transceiver to transmit capability indication information to the network device, the capability indication information indicating the network device to perform terminal configuration according to a first set of communication capabilities among the at least two sets of communication capabilities.

A network device is provided in implementations of the disclosure. The network device includes a transceiver, a processor, and a memory, where the memory is configured to store computer programs, and the processor is configured to invoke and execute the computer programs stored in the memory to cause the transceiver to receive at least two sets of communication capabilities reported by a terminal device in an initial access procedure of the terminal device, cause the transceiver to receive capability indication information transmitted by the terminal device, the capability indication information indicating the network device to perform terminal configuration according to a first set of communication capabilities among the at least two sets of communication capabilities, and perform the terminal configuration according to the first set of communication capabilities.

BRIEF DESCRIPTION OF THE DRAWINGS

FIG. 9 is a flowchart illustrating a method for terminal capability reporting according to another implementation of the disclosure.

FIG. 10 is a flowchart illustrating a method for terminal configuration according to another implementation of the disclosure.

FIG. 11 is a schematic diagram illustrating an architecture with an information interaction interface between two base stations.

DETAILED DESCRIPTION

Figure 1:
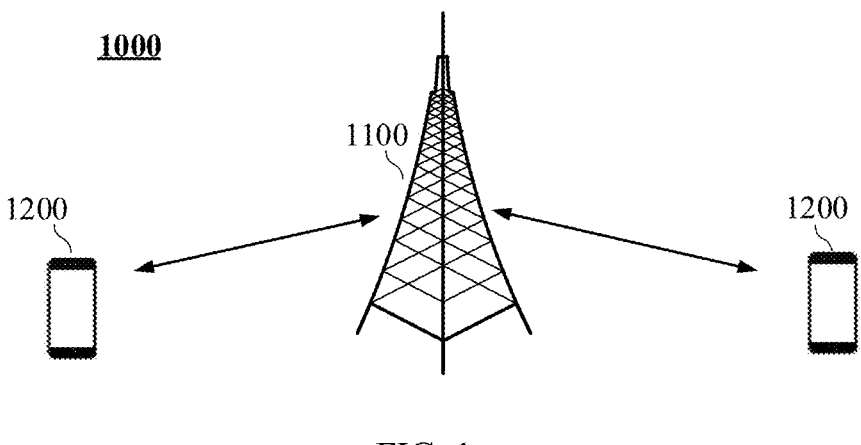
FIG. 1 is a schematic diagram illustrating an architecture of a communication system according to implementations of the disclosure.

The following will illustrate technical solutions of implementations of the disclosure with reference to accompanying drawings of implementations of the disclosure.

The technical solutions in implementations of the disclosure can be applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (Wi-Fi), a $5^{th}$-generation (5G) system, or other communication systems.

Generally speaking, a conventional communication system supports a limited number of connections and therefore is easy to implement. However, with development of communication technology, a mobile communication system not only supports conventional communication but also supports, for example, device to device (D2D) communication, machine to machine (M2M) communication, machine type communication (MTC), and vehicle to vehicle (V2V) communication. Implementations herein can also be applicable to these communication systems.

Optionally, a communication system in implementations of the disclosure can be applicable to a carrier aggregation (CA) scenario, a dual connectivity (DC) scenario, and a standalone (SA) scenario.

Implementations of the disclosure are described in conjunction with a network device and a terminal device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, a user device, etc.

The terminal device may be a station (STA) in a WLAN, a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, or a terminal device in a next-generation communication system such as an NR network, a terminal device in a future evolved public land mobile network (PLMN), etc.

In implementations of the disclosure, the terminal device may be deployed on land, for example, deployed indoors or outdoors, and may be handheld, wearable, or vehicle-mounted. The terminal device may also be deployed on water, for example, on a ship, etc. The terminal device may also be deployed in the air, for example, on an airplane, an air balloon, a satellite, etc.

In implementations of the disclosure, the terminal device may be a mobile phone, a pad, a computer with a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, etc.

By way of example rather than limitation, in implementations of the disclosure, the terminal device may also be a wearable device. The wearable device may also be referred to as a wearable smart device, which is a generic term of wearable devices obtained through intelligentization designing and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

In implementations of the disclosure, the network device may be a device configured to communicate with a mobile device. The network device may be an access point (AP) in the WLAN, a base transceiver station (BTS) in the GSM or CDMA, may also be a Node B (NB) in WCDMA, and may further be an evolutional Node B (eNB or eNodeB) in LTE, or a relay station or AP, or an in-vehicle device, a wearable device, a g-Node B (gNB) in the NR network, a network device in the future evolved PLMN, or the like.

By way of example rather than limitation, in implementations of the disclosure, the network device may be of mobility. For example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station located on land, water, etc.

In implementations of the disclosure, the network device may provide services for a cell, and the terminal device communicates with the network device through a transmission resource (for example, a frequency domain resource or a spectrum resource) for the cell. The cell may be a cell corresponding to the network device (for example, a base station). The cell may correspond to a macro base station, and may correspond to a base station corresponding to a small cell. The small cell may include: a metro cell, a micro cell, a pico cell, a femto cell, and the like. These small cells are characterized by small coverage and low transmission power and are adapted to provide data transmission service with high-rate.

FIG. 1 schematically illustrates one network device 1100 and two terminal devices 1200. Optionally, a wireless communication system 1000 may include multiple network devices 1100, and there may be other numbers of terminal devices in the coverage of each network device 1100, which is not limited herein. Optionally, the wireless communication system 1000 illustrated in FIG. 1 may further include other network entities such as a mobility management entity (MME), an access and mobility management function (AMF), etc., which is not limited herein.

It should be understood that, the terms "system" and "network" herein are usually interchangeable. The term "and/or" herein is used to describe an association relationship between associated objects and represents that three relationships may exist. For example, A and/or B may represent the following three cases: only A exists, both A and B exist, and only B exists. The character "/" herein generally indicates an "or" relationship between the associated objects.

In the description of implementations of the disclosure, the term "corresponding" can mean that there is a direct or indirect correspondence between two elements, or that there is an association between two elements, or that there is a relationship of "indicating" and "being indicated", "configuring" and "being configured", and the like.

To clearly illustrate ideas of implementations of the disclosure, a process of terminal capability reporting in a communication system and related contents are briefly described first.

Figure 2:
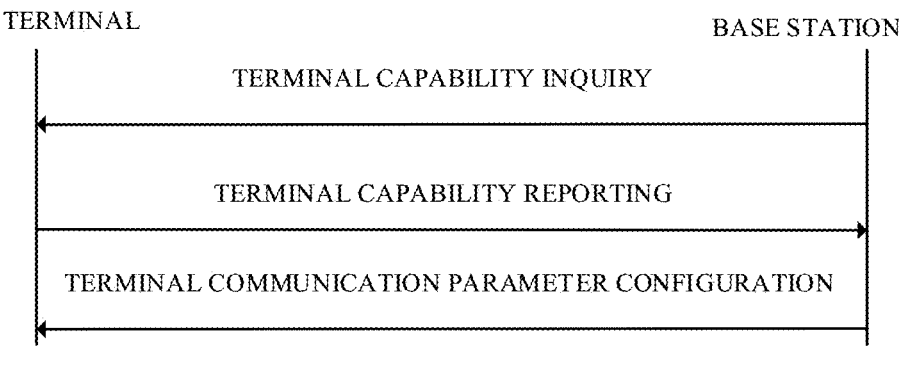
FIG. 2 is a schematic diagram illustrating a process of reporting a communication capability by a terminal at initial access.

For terminal capability reporting, referring to FIG. 2, when initially accessing the network, a terminal may report to a network its own communication capability such as a power class (PC), a multiple input multiple output (MIMO) capability, etc., and these capability parameters remain unchanged during subsequent communication with a base station. The base station performs corresponding configuration according to the communication capability reported by the terminal, to ensure the normal establishment of a communication connection. In an actual network, the network condition of the terminal is changing. As a result, the communication capability of the terminal cannot optimally match an actual capability. In a typical scenario, for example, a terminal in a single-band operating mode and in a multi-band simultaneous operating mode may have problems in capability coordination and matching.

A multi-card terminal refers to a terminal device such as a phone with multiple subscriber identification module (SIM) cards, where the multiple SIM cards may belong to the same operator or belong to different operators. The multiple SIM cards can be configured by a user according to their usage requirements. For example, an SIM card belonging to operator A may be selected by the user to answer a phone call (for example, because a voice charge for operator A is low), and an SIM card belonging to operator B may be selected by the user for data services (for example, because a data charge for operator B is low), such that one phone can be connected with multiple different operator networks simultaneously to operate with multiple different operator services.

Furthermore, the multi-card terminal can be further classified according to whether the multiple SIM cards can operate simultaneously. For example, a dual-card terminal may include a dual-standby single-active terminal and a dual-standby dual-active terminal. For the dual-standby single-active terminal, two cards can be in a standby reception state simultaneously, but only one card can be in a connected state (a transmission state). For the dual-standby dual-active terminal, two cards can be in a standby state or a connected state (a transmission state) simultaneously. Each card in the multi-card terminal may operate in a $2^{nd}$-generation (2G) network, a $3^{rd}$-generation (3G) network, a $4^{th}$-generation (4G) network, a 5G network, or other networks, which depends on a selection of the user.

Figure 3:
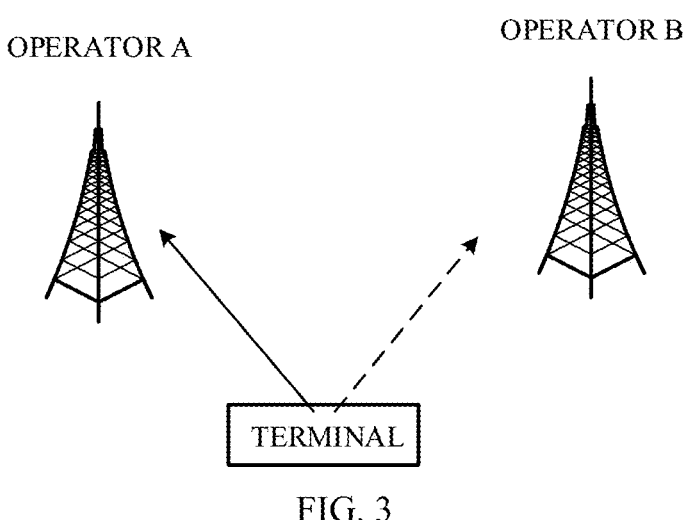
FIG. 3 is a schematic diagram illustrating an architecture of a connection established between a terminal and multiple operator networks.

For the multi-band simultaneous operating mode, referring to FIG. 3, the terminal usually supports multiple formats and multiple bands. The terminal establishes a connection with a network or a cell in a target band during communication. In some scenarios, the terminal may establish connections with multiple cells, where the multiple cells may be in networks belonging to the same operator or networks belonging to different operators. A scenario where the terminal establishes connections with multiple cells belonging to the same operator includes a scenario adopting CA, DC, evolved universal terrestrial radio access (E-UTRA)-NR DC (EN-DC), etc. There are various scenarios where the terminal establishes connections with multiple cells belonging to different operators. For example, a dual-card terminal can establish connections with different operator networks in the same band or different bands.

Figure 4:
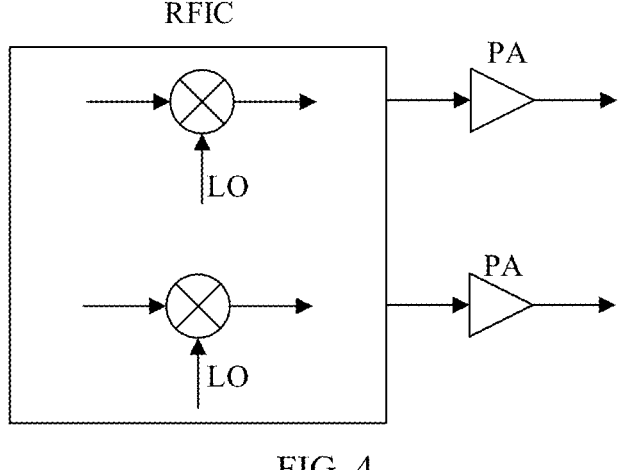
FIG. 4 is a schematic structural diagram illustrating a transmission path of a radio frequency (RF) architecture in a terminal.

For the hardware resources of the terminal, the hardware of the terminal includes a radio frequency (RF) architecture in the terminal. For example, for a transmission path, referring to FIG. 4, two up-conversion paths may be provided in a radio frequency integrated circuit (RFIC) for the conversion from a baseband signal to an RF signal, and a power amplifier (PA) outside is connected to the RFIC for the power amplification of the RF signal. A multi-mode multi-band PA may be adopted. The one PA can support amplification in multiple bands but can usually perform amplification in merely one band at the same time.

Figure 5:
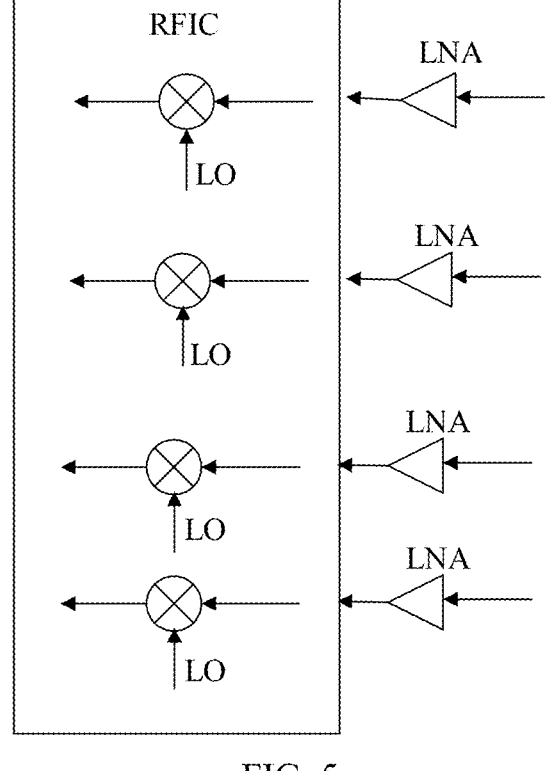
FIG. 5 is a schematic structural diagram illustrating a reception path of an RF architecture in a terminal.

In comparison, the structure of a reception path of the terminal can refer to FIG. 5. Similar to the transmission path, four reception paths are supported in some bands in NR, where a low noise amplifier (LNA) can also support multiple modes and multiple bands but can perform amplification in merely one band at the same time.

Figure 6:
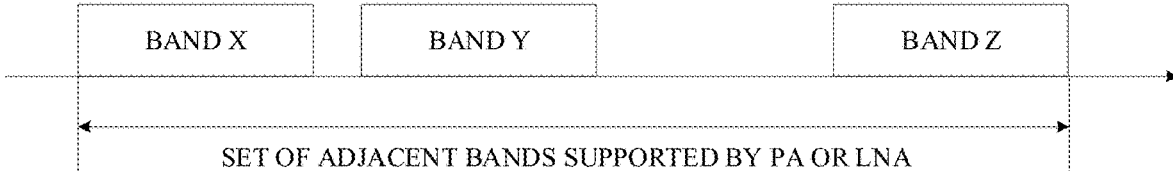
FIG. 6 is a schematic diagram illustrating multiple bands supported by a power amplifier (PA) or a low noise amplifier (LNA) in a terminal.

The multi-mode multi-band PA or LNA mentioned above can usually support a set of adjacent bands. Referring to FIG. 6, the PA or LNA supports band X, band Y, and band Z.

The above describes various operating modes and operating scenarios (or referred to as operating state) of the terminal. At present, the terminal usually adopts static capability reporting. That is, the capability of the terminal is considered to remain unchanged during operation. However, in some scenarios, due to various influence factors, the communication capability reported by the terminal is different from a capability in the actual network. That is, the network configures the terminal according to the capability reported by the terminal, but a configuration parameter is inconsistent with the actual capability of the terminal, thereby affecting a performance of the terminal. It can be seen that the matching between terminal capability reporting and the actual situation needs to be studied and solved.

Figure 7:
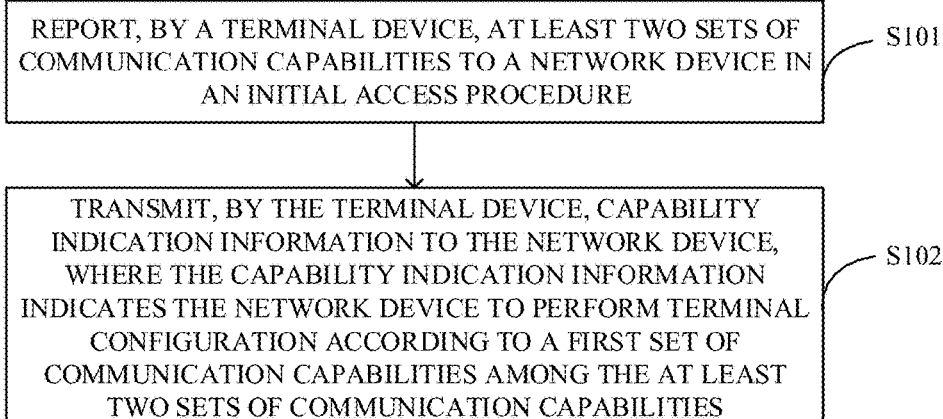
FIG. 7 is a flowchart illustrating a method for terminal capability reporting according to an implementation of the disclosure.

To this end, a method for terminal capability reporting is provided in implementations of the disclosure. Referring to FIG. 7, the method is applied to a terminal device and includes the following.

S101, the terminal device reports at least two sets of communication capabilities to a network device in an initial access procedure.

S102, the terminal device transmits capability indication information to the network device, where the capability indication information indicates the network device to perform terminal configuration according to a first set of communication capabilities among the at least two sets of communication capabilities.

With implementations of the disclosure, when initially accessing the network, the terminal device reports multiple sets of communication capabilities, for example, multiple sets of PC capabilities. Then during communication, the terminal device can transmit to the network device the capability indication information to indicate the network device to perform the terminal configuration according to a suitable set of communication capabilities. As such, the inconsistency between an actual communication capability of the terminal and the communication capability reported can be avoided, thereby improving a performance of the terminal as much as possible.

Figure 8:
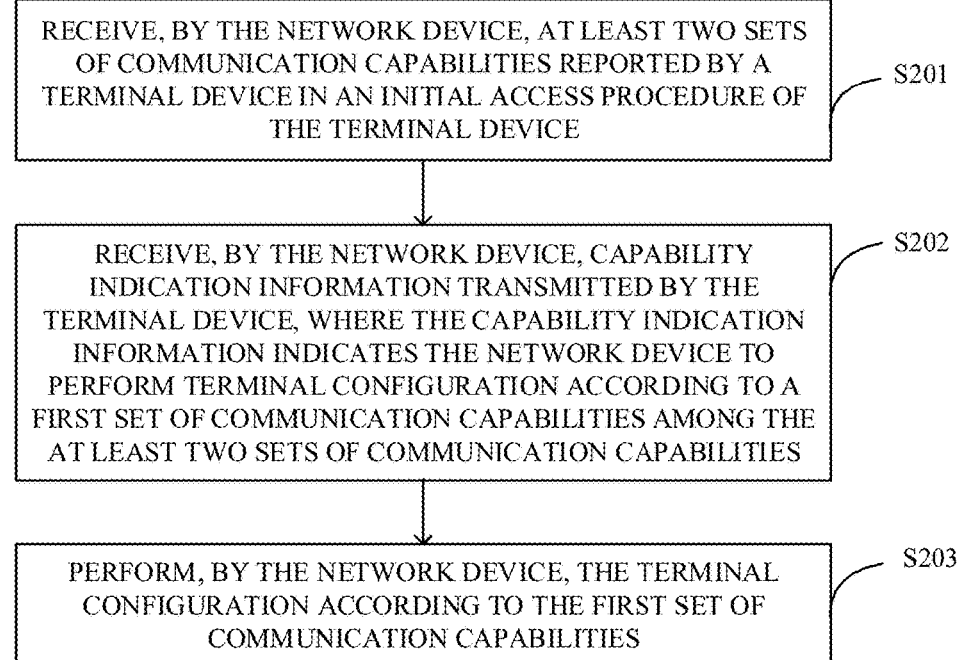
FIG. 8 is a flowchart illustrating a method for terminal configuration according to an implementation of the disclosure.

Correspondingly, a method for terminal configuration is further provided in implementations of the disclosure. Referring to FIG. 8, the method is applied to a network device and includes the following.

S201, the network device receives at least two sets of communication capabilities reported by a terminal device in an initial access procedure of the terminal device.

S202, the network device receives capability indication information transmitted by the terminal device, where the capability indication information indicates the network device to perform terminal configuration according to a first set of communication capabilities among the at least two sets of communication capabilities.

S203, the network device performs the terminal configuration according to the first set of communication capabilities.

With implementations of the disclosure, when initially accessing the network, the terminal device reports multiple sets of communication capabilities. During subsequent communication, the network device receives the capability indication information transmitted by the terminal device, and performs the terminal configuration according to the indicated set of communication capabilities. As such, the inconsistency between the configuration parameter for the terminal and the actual communication capability of the terminal can be avoided, thereby improving quality of communication services of the terminal.

In implementations of the disclosure, optionally, the at least two sets of communication capabilities include a set of default communication capabilities, and the default communication capabilities are used for the network device to perform the terminal configuration according to the default communication capabilities on condition that the network device fails to receive the capability indication information.

In implementations of the disclosure, optionally, the at least two sets of communication capabilities are in one-to-one correspondence with at least two operating states of the terminal device, and the first set of communication capabilities corresponds to a current operating state of the terminal device.

In implementations of the disclosure, optionally, the at least two operating states include at least two of: a single-band transmission and/or reception state, a multi-band simultaneous transmission and/or reception state, a single-operator-network access state, a multi-operator-network simultaneous access state, a high-speed moving state, or a low-speed moving state.

In implementations of the disclosure, optionally, the at least two sets of communication capabilities include at least two sets of PC capabilities. Optionally, the at least two sets of communication capabilities include at least two sets of MIMO capabilities.

In other implementations of the disclosure, the at least two sets of communication capabilities may further include other types of communication capabilities of the terminal.

In implementations of the disclosure, optionally, the terminal device includes a multi-card terminal device.

According to at least one implementation of the disclosure mentioned above, the terminal can report capabilities in various scenarios to the network through initial capability reporting, and the network determines which set of capabilities to use according to a subsequent capability indication. Such reporting and indicating mechanism is easy to implement in application and has a good application effect.

In order not to increase processing complexity of the initial access procedure, a method for terminal capability reporting is further provided in implementations of the disclosure. Referring to FIG. 9, the method is applied to a terminal device and includes the following.

S301, the terminal device reports a first communication capability to a network device in an initial access procedure.

S302, the terminal device transmits first information to the network device, where the first information indicates the network device to update a communication capability of the terminal device.

With implementations of the disclosure, when initially accessing the network, the terminal device reports merely one set of communication capabilities, for example, one set of PC capabilities. Then during communication, the terminal device can transmit to the network device indication information indicative of updating the communication capability of the terminal, to indicate the network device to update the communication capability of the terminal and not to adopt the communication capability initially reported by the terminal. As such, the inconsistency between an actual communication capability of the terminal and the communication capability reported can be avoided, thereby improving a performance of the terminal as much as possible.

Correspondingly, a method for terminal configuration is further provided in implementations of the disclosure. Referring to FIG. 10, the method is applied to a network device and includes the following.

S401, the network device receives a first communication capability reported by a terminal device in an initial access procedure of the terminal device.

S402, the network device receives first information transmitted by the terminal device, where the first information indicates the network device to update a communication capability of the terminal device.

S403, the network device updates the communication capability of the terminal device.

With implementations of the disclosure, when initially accessing the network, the terminal device reports a set of communication capabilities. During subsequent communication, the network device receives information indicative of updating the communication capability and transmitted by the terminal device, and updates the communication capability of the terminal in response to reception of the information. As such, the inconsistency between the configuration parameter for the terminal and the actual communication capability of the terminal can be avoided, thereby improving quality of communication services of the terminal.

In implementations of the disclosure, optionally, the first information contains information of a second communication capability of the terminal device, and the information of the second communication capability is used for the network device to update the first communication capability to the second communication capability when the network device updates the communication capability of the terminal device.

In implementations of the disclosure, optionally, the terminal device transmits second information to the network device, where the second information contains information of a second communication capability of the terminal device, and the second information indicates the network device to update the first communication capability to the second communication capability when the network device updates the communication capability of the terminal device.

In implementations of the disclosure, optionally, the first communication capability and the second communication capability are in one-to-one correspondence with two operating states of the terminal device, and the second communication capability corresponds to a current operating state of the terminal device.

In implementations of the disclosure, optionally, the at least two operating states include at least two of: a single-band transmission and/or reception state, a multi-band simultaneous transmission and/or reception state, a single-operator-network access state, a multi-operator-network simultaneous access state, a high-speed moving state, or a low-speed moving state.

In implementations of the disclosure, optionally, the first communication capability includes a first PC capability, and the second communication capability includes a second PC capability. Optionally, the first communication capability includes a first MIMO capability, and the second communication capability includes a second MIMO capability.

In other implementations of the disclosure, the at least two sets of communication capabilities may further include other types of communication capabilities of the terminal.

In implementations of the disclosure, optionally, the terminal device includes a multi-card terminal device.

According to at least one implementation of the disclosure mentioned above, the terminal reports a set of communication capabilities during initial capability reporting, and subsequently updates the communication capability according to an actual network condition or operating state, where indication information indicative of capability updating and new capability information may be transmitted to the network together or transmitted separately. In such a processing mechanism, the initial reporting process of the terminal is compatible with the existing processing manner, and the capability information is updated with the change of the operating state of the terminal, which can solve the mismatch between the actual communication capability of the terminal and the capability reported.

The above describes implementation manners of the method for terminal capability reporting and the method for terminal configuration in implementations of the disclosure, and the following will describe specific implementation processes in implementations of the disclosure with multiple specific examples.

Figure 12:
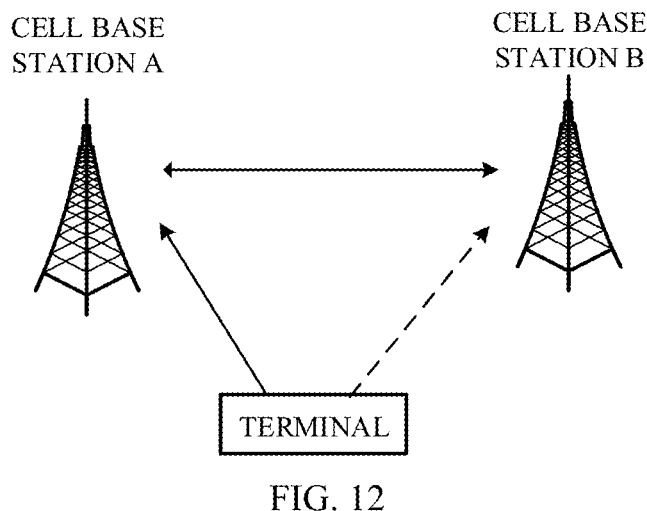
FIG. 12 is a schematic diagram illustrating an architecture without an information interaction interface between two base stations.

In various implementations described below, the terminal supports operating simultaneously in two cells. According to whether there is information interaction between two cell base stations (cell base station A and cell base station B), there are two situations: "with information interaction interface" and "without information interaction interface", as illustrated in FIG. 11 and FIG. 12 respectively. In FIG. 11, for example, cell base station A and cell base station B are in networks belonging to different operators, and there is no information interaction and no information interaction interface between cell base station A and cell base station B. In FIG. 12, there is information interaction and an information interaction interface between cell base station A and cell base station B.

In a scenario where there is no information interaction between cell base stations as illustrated in FIG. 11, the base stations are unable to negotiate terminal configuration. When the two cells operate simultaneously, the terminal is able to balance wireless communication capabilities of the terminal between the two cells. In a scenario where there is information interaction between cell base stations as illustrated in FIG. 12, both the base stations and the terminal are able to coordinate the wireless communication capabilities of the terminal.

The following implementations will describe a communication capability coordination mechanism implemented by the terminal as illustrated in FIG. 12.

Implementation 1: the terminal reports multiple sets of capabilities corresponding to different operating states.

Figure 13:
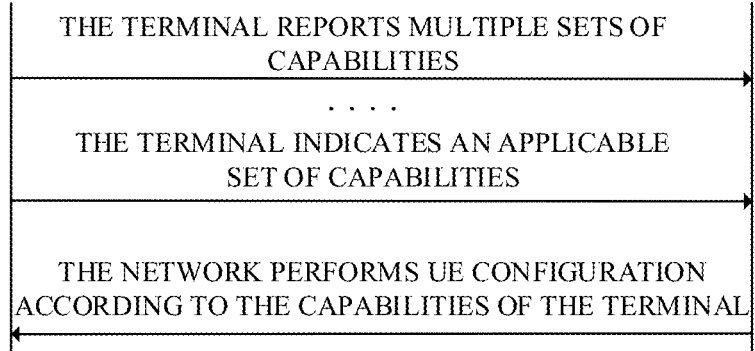
FIG. 13 is a schematic diagram illustrating a process of terminal capability indication according to implementations of the disclosure.

Referring to FIG. 13, in this implementation, for a terminal supporting operating simultaneously in multiple bands, the terminal reports multiple sets of communication capabilities to the network. For example, the multiple sets of communication capabilities include a capability in a single-band operating scenario and a capability in a multi-band simultaneous operating scenario. The terminal indicates, according to an actual operating state, that the network adopts a set of communication capabilities among the multiple sets of communication capabilities. The network performs UE configuration according to the set of communication capabilities indicated by the terminal.

For clarity of description, in the following, it is assumed that cell A is in band X, cell B is in band Y, the two bands are close to each other in frequency (reference can be made to FIG. 6), and cell A and cell B may belong to the same operator or different operators.

If cell A and cell B belong to the same operator, a scenario thereof is that cell A and cell B are not in a primary secondary cell (PScell) operating mode such as CA, DC, EN-DC, etc., and there is no correlation and no information interaction interface between cell A and cell B.

In various implementations of the disclosure, if cell A and cell B belong to the same operator, it can be considered that the terminal is in a single-operator-network access state. If cell A and cell B belong to different operators, it can be considered that the terminal is in a multi-operator-network simultaneous access state.

The terminal adopts a set of hardware such as a PA supporting multiple bands, to support spectrums of cell A and cell B. The PA can operate in merely one band at the same time, i.e., the PA can perform amplification in merely one band. Bands supported by the PA can be regarded as a band set.

The PA can operate in merely one band at the same time. Therefore, when the terminal is already operating in a band for a cell, the terminal cannot use the PA for signal transmission no matter whether another cell operates in the same band or a different band.

Case 1: the terminal reports uplink (UL) transmission power.

Figure 14:
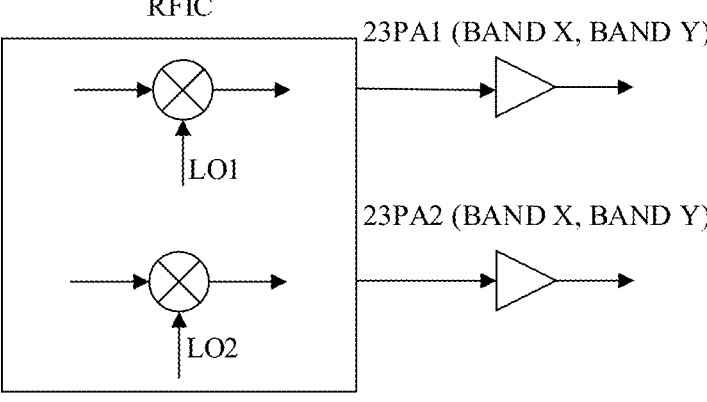
FIG. 14 is a schematic diagram illustrating an RF architecture in a terminal with two PAs according to implementations of the disclosure.

Referring to FIG. 14, for example, for the UL transmission power of the terminal, it is assumed that hardware of the terminal adopts two PAs each with power classes of PC3 (23 decibel-milliwatts (dBm)) (denoted as PA1 and PA2 in FIG. 14).

Figure 15:
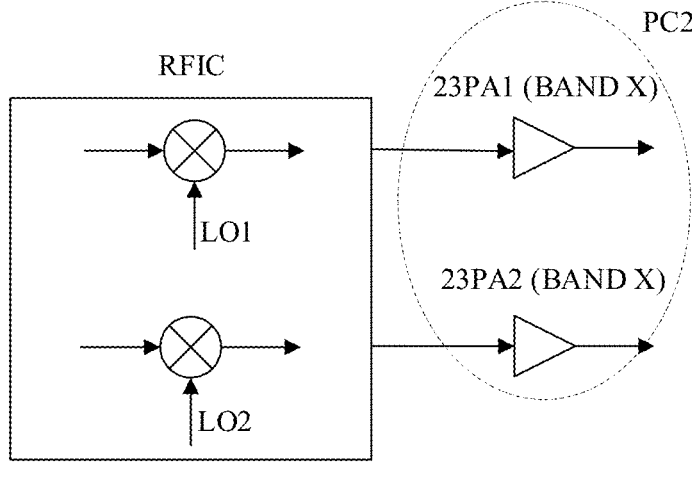
FIG. 15 is a schematic diagram illustrating the terminal in implementations in FIG. 14 in a single-band transmission state.
Figure 16:
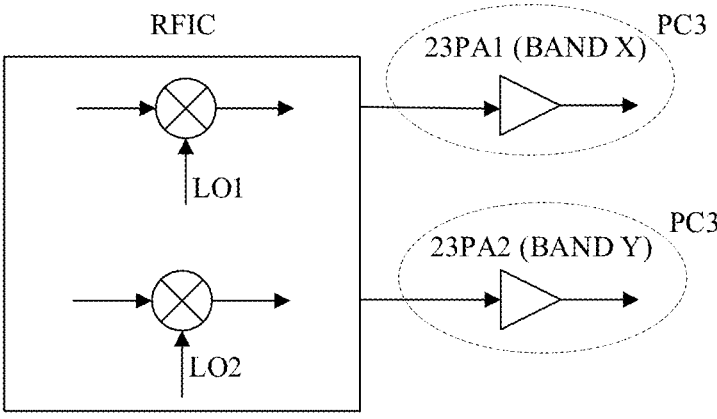
FIG. 16 is a schematic diagram illustrating the terminal in implementations in FIG. 14 in a multi-band transmission state.

Referring to FIG. 15, in a single-band transmission state, the two PAs perform transmission at the same time, and thus a PC of the terminal can reach PC2 (26 dBm). Referring to FIG. 16, in a multi-band transmission state, only one PA performs transmission, and thus the PC of the terminal can be only PC3, which is lower than PC2. That is, in different situations, the terminal has different PC capability parameters.

The terminal reports corresponding wireless communication capabilities to two cell base stations respectively when initially accessing the two cells. If the terminal reports PC2, the PC of the terminal can actually reach only PC3 in a single band when transmission is performed in two bands at the same time. If the terminal reports PC3, even if the terminal has a hardware condition for the PC of the terminal to reach PC2, the PC of the terminal cannot reach PC2 under limitation of PC3 reported when transmission is performed in only one band, which actually results in waste of the transmission power capability of the terminal.

Figures 17, 18:
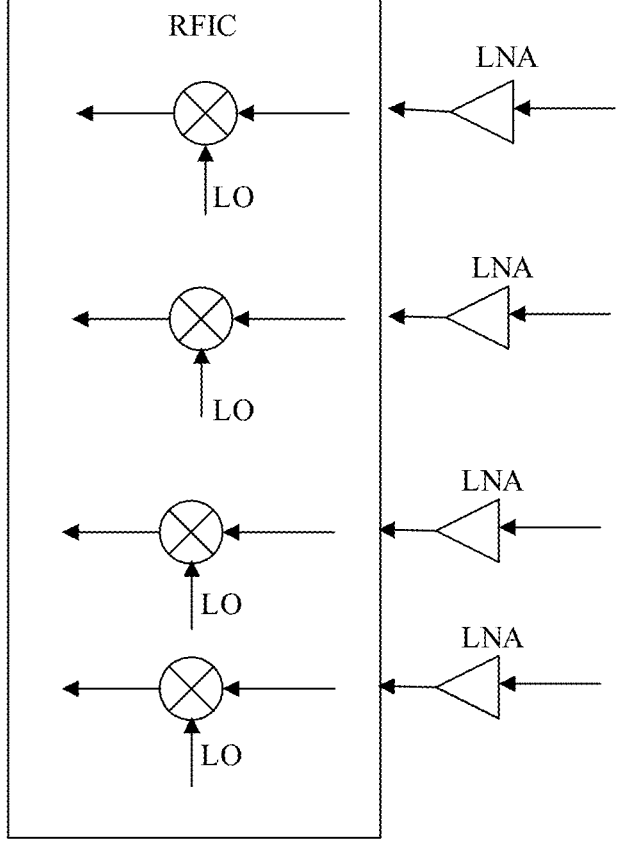
FIG. 17 is a schematic diagram illustrating a process of reporting and indicating multiple sets of capabilities by a terminal according to implementations of the disclosure.
FIG. 18 is a schematic diagram illustrating 4-multiple input multiple output (MIMO)-layer reception when a terminal is in a single-band reception state according to implementations of the disclosure.

To effectively distinguish different transmission PCs of the terminal in a single-band transmission scenario and a multi-band transmission scenario, referring to FIG. 17, the terminal can respectively report in band X and in band Y two sets of PC capabilities, including PC2 (corresponding to a power capability when transmission is performed in only a single band) and PC3 (corresponding to a power capability when transmission is performed in multiple bands). In an actual network, the UE may indicate the network which set of capabilities to use according to an actual situation (e.g., whether the terminal is in the multi-band transmission scenario).

It needs to be noted that, in the above examples, cell A and cell B are in different bands. In fact, the above reporting mechanism can also be adopted when cell A and cell B are in the same band and for example, belong to different operators.

Case 2: the terminal reports a downlink (DL) MIMO reception capability.

Figure 19:
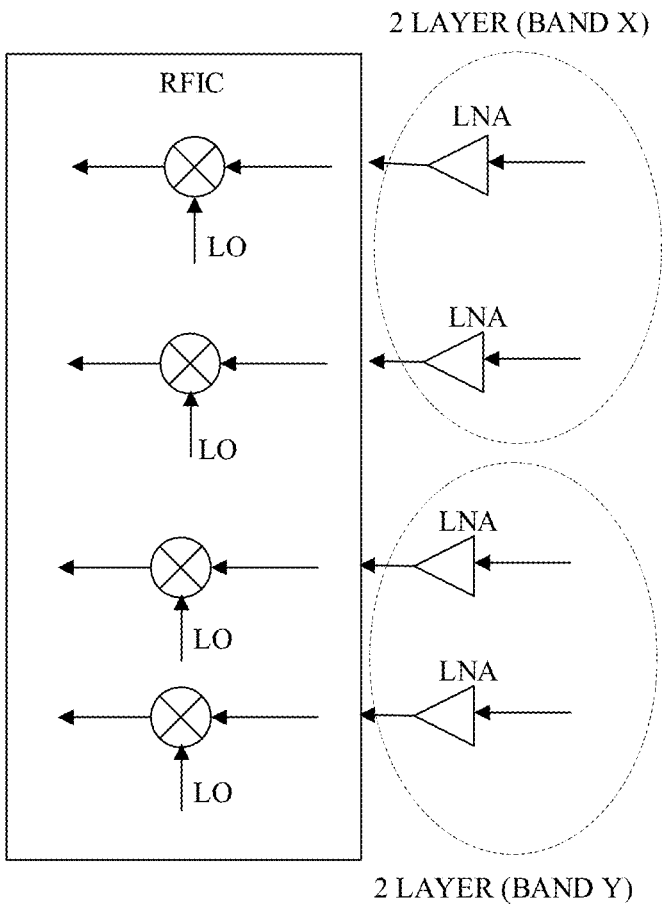
FIG. 19 is a schematic diagram illustrating 2-MIMO-layer reception when a terminal is in a multi-band reception state according to implementations of the disclosure.

The transmission power of the terminal is illustrated as an example in case 1 above. In fact, there are also similar problems in reception of the terminal. Referring to FIGS. 18 and 19, an LNA, a local oscillator (LO), and the like in a reception path of the terminal can also operate in merely one band at the same time. It is assumed that the terminal in a single-band reception state can support 4-MIMO-layer transmission, and the reception capability of the terminal is changed to 2-MIMO-layer transmission when the terminal is in a multi-band simultaneous reception state. The terminal can report both 4-MIMO-layer transmission and 2-MIMO-layer transmission to the network during capability reporting, and the terminal indicates an applicable set of capabilities according to an actual situation (e.g., the terminal is in the single-band reception state or the multi-band simultaneous reception state).

In at least one implementation mentioned above, a PC capability in the single-band operating scenario can be assigned as a default communication capability, and a 4-MIMO-layer transmission capability can also be assigned as the default communication capability. The default communication capability is reported, so that the network device can perform terminal configuration according to the default communication capability on condition that the network device fails to receive the capability indication information.

In at least one implementation mentioned above, the terminal reports capabilities in various scenarios to the network through initial capability reporting, and the network determines which set of capabilities to use according to a subsequent capability indication. In this manner, the terminal does not need to update its wireless capability, which is easy to perform.

Implementation 2: the terminal updates a communication capability according to an actual operating state.

As mentioned above, the existing manner for terminal capability reporting is static reporting. In static reporting, the terminal reports a capability of the terminal only when initially accessing the network and there is no subsequent modification. The reporting method provided in implementation 1 follows a similar principle to some extent. That is, the terminal reports at initial access all capabilities subsequently required, and the terminal determines which capability to use for subsequent communication according to a subsequent actual situation.

Differently, in implementation 2, the terminal updates the capability of the terminal during communication to adapt to different actual operating conditions.

Figure 20:
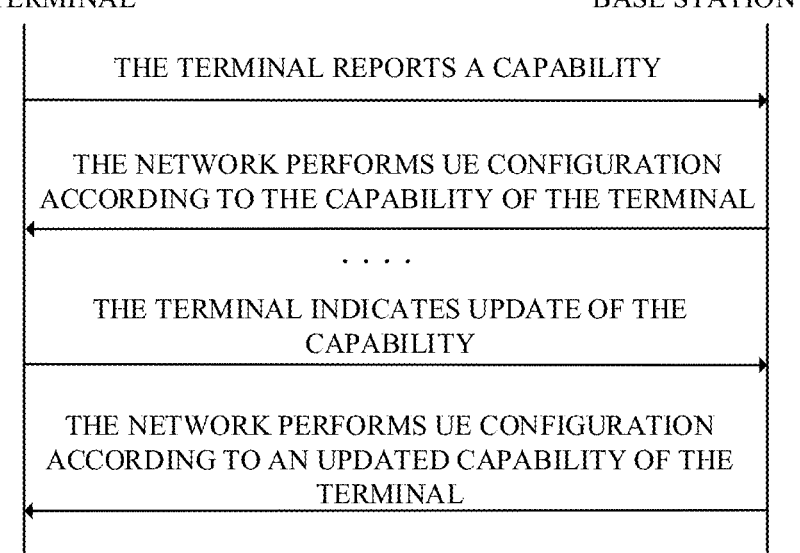
FIG. 20 is a schematic diagram illustrating a process of updating a capability of a terminal by the terminal during communication according to implementations of the disclosure.

Hereinafter, the multi-band simultaneous operating scenario is still illustrated as an example. Referring to FIG. 20, for a terminal having a multi-band simultaneous operating capability, the terminal reports its communication capability, where the capability may be a capability based on a single-band operating scenario or a capability based on a multi-band simultaneous operating scenario. When the communication capability of the terminal reported previously is inconsistent with an actual operating state of the terminal, the terminal updates the communication capability of the terminal to the network, and the network configures the terminal with a new communication capability.

Case 1: the terminal reports UL transmission power.

It is assumed that the terminal reports respectively to cell A and cell B an initial capability, i.e., PC2 supported in the single-band operating scenario.

Figure 21:
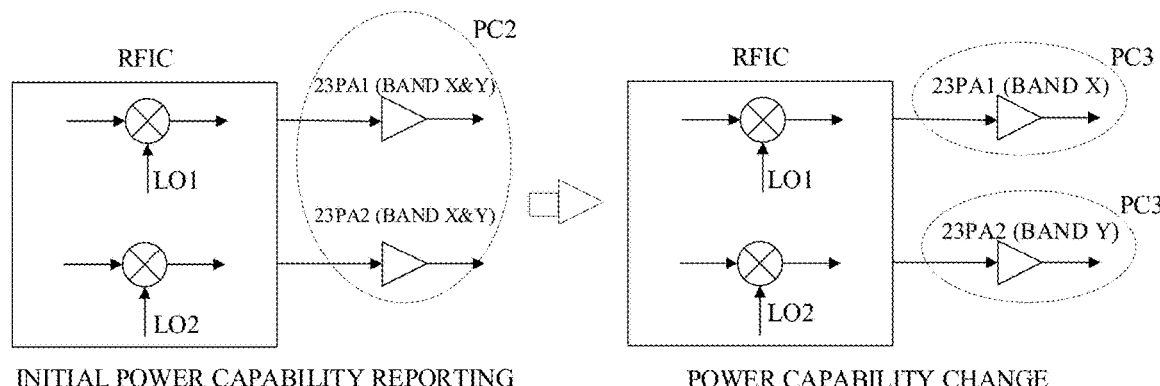
FIG. 21 is a schematic diagram illustrating a comparison between power capabilities of a terminal before and after update according to implementations of the disclosure.

Referring to FIG. 21, when a multi-band operating mode is activated (for example, the terminal accesses cell A and cell B that belong to different operators), an actual transmission power capability of the terminal is merely PC3 in cell A (band X) and cell B (band Y). The terminal transmits a capability change indication to cell A and cell B, and reports a new capability (PC3) of the terminal to the network via radio resource control (RRC). The new capability of the terminal and the capability change indication may be reported to the network together or separately.

The network performs UE configuration according to the new PC capability of PC3 in response to reception of the capability change indication and the new capability of the terminal.

Case 2: the terminal reports a DL MIMO reception capability.

It is assumed that the terminal reports respectively to cell A and cell B an initial capability, i.e., the 4-MIMO-layer reception capability supported in the single-band operating scenario.

Figure 22:
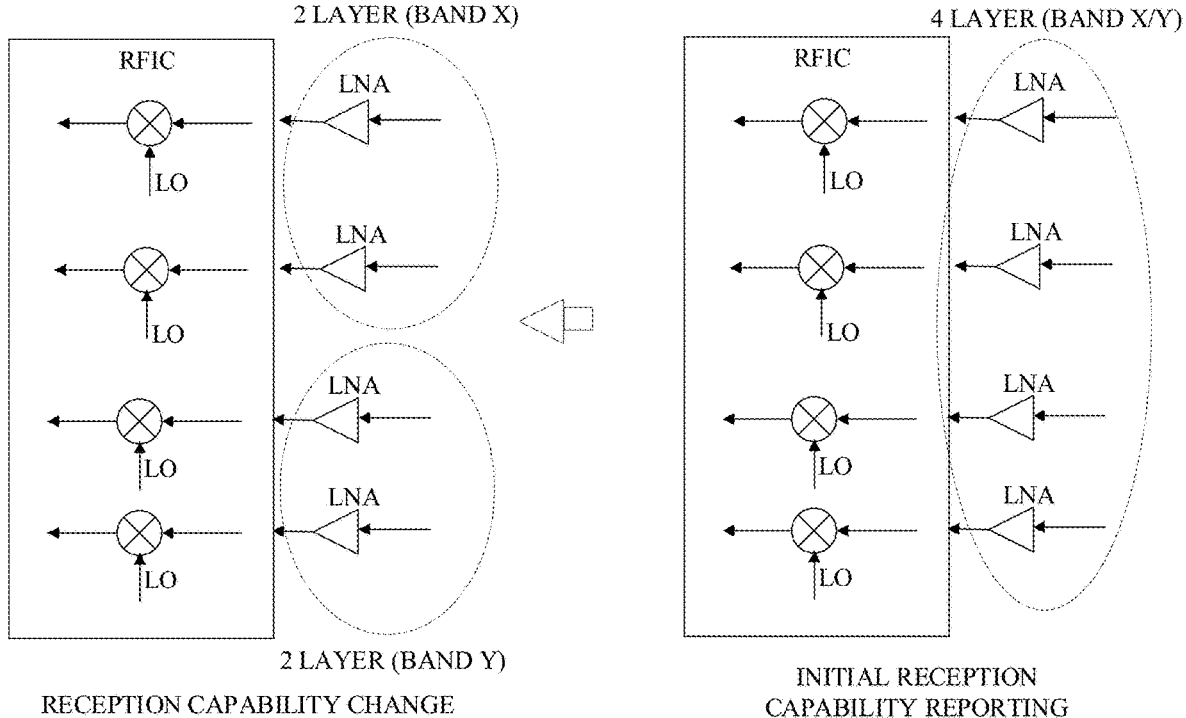
FIG. 22 is a schematic diagram illustrating a comparison between reception capabilities of a terminal before and after update according to implementations of the disclosure.

Referring to FIG. 22, when a multi-band operating mode is activated (for example, the terminal accesses cell A and cell B that belong to different operators), an actual MIMO reception capability of the terminal is merely 2-MIMO-layer reception capability in cell A (band X) and cell B (band Y). The terminal transmits a capability change indication to cell A and cell B, and reports a new capability (2-MIMO-layer reception capability) of the terminal to the network via RRC. The new capability of the terminal and the capability change indication may be reported to the network together or separately.

The network performs UE configuration according to the new MIMO reception capability (2-MIMO-layer reception capability) in response to reception of the capability change indication and the new capability of the terminal.

According to at least one implementation mentioned above, the initial capability reporting process of the terminal is simple and compatible with the existing capability reporting manner, and subsequently the terminal can update the communication capability according to an actual network condition. For example, such updating can be performed based on function interaction among the terminal, the base station, and the core network.

Figure 23:
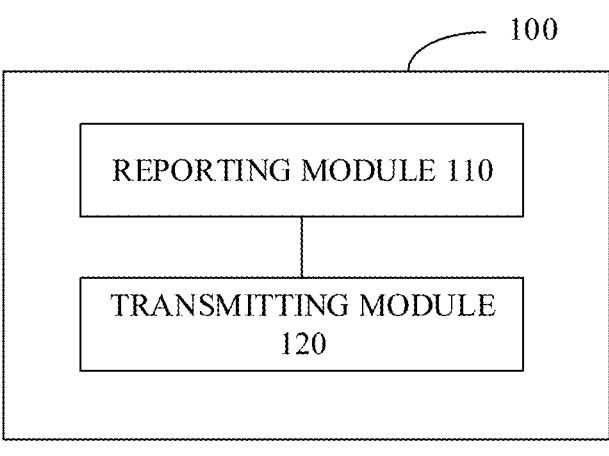
FIG. 23 is a schematic structural block diagram illustrating a terminal device according to an implementation of the disclosure.

The above describes specific settings and implementation manners of implementations of the disclosure from different perspectives in implementations. Corresponding to the processing method of at least one implementation mentioned above, a terminal device 100 is further provided in implementations of the disclosure. Referring to FIG. 23, the terminal device 100 includes a reporting module 110 and a transmitting module 120. The reporting module 110 is configured to report at least two sets of communication capabilities to a network device in an initial access procedure. The transmitting module 120 is configured to transmit capability indication information to the network device, where the capability indication information indicates the network device to perform terminal configuration according to a first set of communication capabilities among the at least two sets of communication capabilities.

Figure 24:
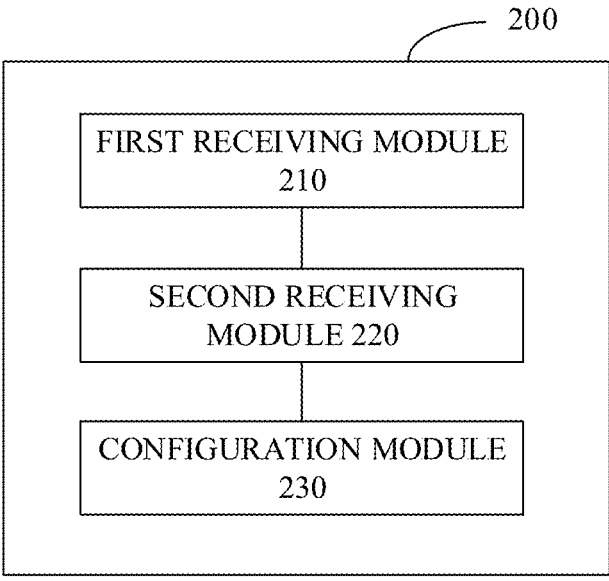
FIG. 24 is a schematic structural block diagram illustrating a network device according to an implementation of the disclosure.

Corresponding to the processing method of at least one implementation mentioned above, a network device 200 is further provided in implementations of the disclosure. Referring to FIG. 24, the network device 200 includes a first receiving module 210, a second receiving module 220, and a configuration module 230. The first receiving module 210 is configured to receive at least two sets of communication capabilities reported by a terminal device in an initial access procedure of the terminal device. The second receiving module 220 is configured to receive capability indication information transmitted by the terminal device, where the capability indication information indicates the network device to perform terminal configuration according to a first set of communication capabilities among the at least two sets of communication capabilities. The configuration module 230 is configured to perform the terminal configuration according to the first set of communication capabilities.

Figure 25:
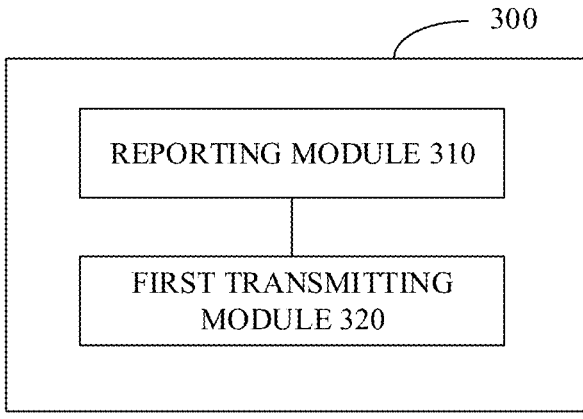
FIG. 25 is a schematic structural block diagram illustrating a terminal device according to another implementation of the disclosure.

Corresponding to the processing method of at least one implementation mentioned above, a terminal device 300 is further provided in implementations of the disclosure. Referring to FIG. 25, the terminal device 300 includes a reporting module 310 and a first transmitting module 320. The reporting module 310 is configured to report a first communication capability to a network device in an initial access procedure. The first transmitting module 320 is configured to transmit first information to the network device, where the first information indicates the network device to update a communication capability of the terminal device.

Figure 26:
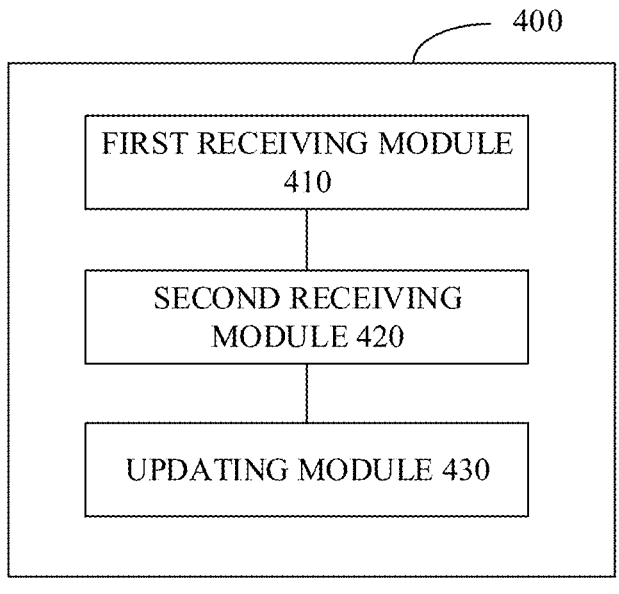
FIG. 26 is a schematic structural block diagram illustrating a network device according to another implementation of the disclosure.

Corresponding to the processing method of at least one implementation mentioned above, a network device 400 is further provided in implementations of the disclosure. Referring to FIG. 26, the network device 400 includes a first receiving module 410, a second receiving module 420, and an updating module 430. The first receiving module 410 is configured to receive a first communication capability reported by a terminal device in an initial access procedure of the terminal device. The second receiving module 420 is configured to receive first information transmitted by the terminal device, where the first information indicates the network device to update a communication capability of the terminal device. The updating module 430 is configured to update the communication capability of the terminal device.

The terminal devices 100 and 300 and the network devices 200 and 400 in implementations of the disclosure can implement corresponding functions of the terminal device in the foregoing method implementations. For processes, functions, implementation manners, and beneficial effects corresponding to various modules (sub-modules, units, components, etc.) in the terminal devices 100 and 300 and the network devices 200 and 400, reference can be made to the corresponding description in the foregoing method implementations, which will not be repeated herein.

It needs to be noted that, the described functions of various modules (sub-modules, units, components, etc.) in the terminal devices 100 and 300 and the network devices 200 and 400 in implementations of the disclosure can be implemented by different modules (sub-modules, units, components, etc.) or by the same module (sub-module, unit, component, etc.). For example, the first transmitting module and the second transmitting module may be different modules or the same module, and can implement corresponding functions of the terminal device in implementations of the disclosure.

Figure 27:
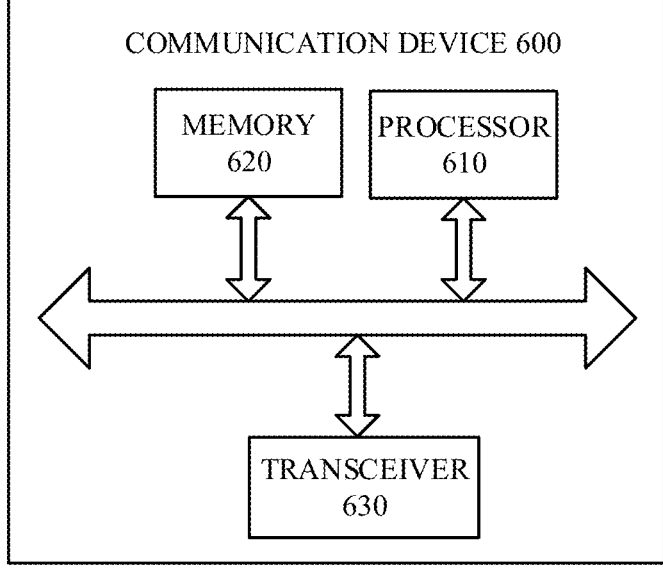
FIG. 27 is a schematic block diagram illustrating a communication device according to implementations of the disclosure.

FIG. 27 is a schematic structural diagram illustrating a communication device 600 according to implementations of the disclosure. The communication device 600 includes a processor 610. The processor 610 is configured to invoke and execute computer programs stored in a memory to perform the method in implementations of the disclosure.

Optionally, the communication device 600 can further include a memory 620. The processor 610 is configured to invoke and execute computer programs stored in the memory 620 to perform the method in implementations of the disclosure.

The memory 620 may be a separate device independent of the processor 610, or may be integrated in the processor 610.

Optionally, the communication device 600 can further include a transceiver 630. The processor 610 can control the transceiver 630 to communicate with other devices. Specifically, the transceiver 630 can transmit information or data to other devices, or receive information or data transmitted by other devices.

The transceiver 630 may include a transmitter and a receiver. The transceiver 630 may further include one or more antennas.

Optionally, the communication device 600 may be the network device in the implementations of the disclosure, and the communication device 600 can implement the corresponding process implemented by the network device in various methods according to implementations of the disclosure, which will not be repeated herein for the sake of simplicity.

Optionally, the communication device 600 may be the terminal device in the implementations of the disclosure, and the communication device 600 can implement the corresponding process implemented by the terminal device in various methods according to implementations of the disclosure, which will not be repeated herein for the sake of simplicity.

Figures 28, 29:
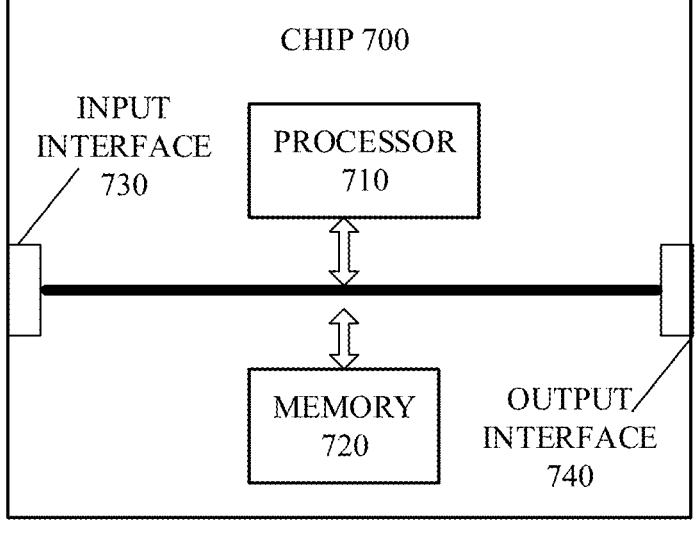
FIG. 28 is a schematic block diagram illustrating a chip according to implementations of the disclosure.
FIG. 29 is a schematic block diagram illustrating a communication system according to implementations of the disclosure.

FIG. 28 is a schematic structural diagram illustrating a chip 700 according to implementations of the disclosure. The chip 700 includes a processor 710. The processor 710 is configured to invoke and execute computer programs stored in a memory to perform the method in implementations of the disclosure.

Optionally, the chip 700 may further include a memory 720. The processor 710 is configured to invoke and execute computer programs stored in the memory 720 to perform the method in implementations of the disclosure.

The memory 720 may be a separate device independent of the processor 710, or may be integrated in the processor 710.

Optionally, the chip 700 may further include an input interface 730. The processor 710 can control the input interface 730 to communicate with other devices or chips. Specifically, the input interface 730 can obtain information or data transmitted by other devices or chips.

Optionally, the chip 700 may further include an output interface 740. The processor 710 can control the output interface 740 to communicate with other devices or chips. Specifically, the output interface 740 can output information or data to other devices or chips.

Optionally, the chip can be applied to the network device in the implementations of the disclosure, and the chip can implement the corresponding process implemented by the network device in various methods according to implementations of the disclosure, which will not be repeated herein for the sake of simplicity.

Optionally, the chip can be applied to the terminal device in the implementations in FIG. 23 or 25 of the disclosure, and the chip can implement the corresponding process implemented by the terminal device in various methods according to implementations of the disclosure, which will not be repeated herein for the sake of simplicity.

It can be understood that, the chip mentioned in the implementations of the disclosure may also be referred to as a system-level chip, a system chip, a chip system, a system-on-a-chip chip, or the like.

The processor mentioned above may be a general-purpose processor, a digital signal processor (DSP), a field programmable gate array (FPGA), an application specific integrated circuit (ASIC), or other programmable logic devices, transistor logic devices, discrete hardware components, etc. The general-purpose processor may be a microprocessor, or may also be any conventional processor, or the like.

The memory mentioned above may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM).

It can be understood that, the memory mentioned above is an example rather than limitation. For example, the memory may be a static RAM (SRAM), a dynamic RAM (DRAM), a synchronous DRAM (SDRAM), a double data rate SDRAM (DDRSDRAM), an enhanced SDRAM (ESDRAM), a synclink DRAM (SLDRAM), and a direct rambus RAM (DRRAM). That is, the memory in implementations of the disclosure is intended to include, but is not limited to, these and any other suitable types of memory.

FIG. 29 is a schematic block diagram illustrating a communication system 800 according to implementations of the disclosure. The communication system 800 includes a terminal device 810 and a network device 820.

The terminal device 810 can be configured to implement the corresponding function implemented by the terminal device in the methods in implementations of the disclosure, and the network device 820 can be configured to implement the corresponding function implemented by the network device in the methods in implementations of the disclosure, which will not be repeated herein for the sake of simplicity.

All or part of the above implementations can be implemented through software, hardware, firmware, or any other combination thereof. When implemented by software, all or part of the above implementations can be implemented in a form of a computer program product. The computer program product includes one or more computer instructions. When the computer program instructions are loaded and executed on a computer, all or part of the processes or functions of the implementations of the disclosure are performed. The computer may be a general-purpose computer, a special-purpose computer, a computer network, or other programmable apparatuses. The computer instructions can be stored in a computer-readable storage medium, or transmitted from one computer-readable storage medium to another computer-readable storage medium. For example, the computer instructions can be transmitted from one website, computer, server, or data center to another website, computer, server, or data center in a wired manner or in a wireless manner. Examples of the wired manner may be, for example, a coaxial cable, an optical fiber, a digital subscriber line (DSL), etc. The wireless manner may be, for example, infrared, wireless, microwave, etc. The computer-readable storage medium may be any computer accessible usable-medium or a data storage device such as a server, a data center, or the like which is integrated with one or more usable media. The usable medium may be a magnetic medium (such as a soft disc, a hard disc, or a magnetic tape), an optical medium (such as a digital video disc (DVD)), or a semiconductor medium (such as a solid state disk (SSD)), etc.

It can be understood that, in various implementations of the disclosure, the magnitude of a sequence number of each process does not mean an order of execution, and the order of execution of each process may be determined by its function and an internal logic and shall not constitute any limitation to an implementation process in implementations of the disclosure.

It will be evident to those skilled in the art that, for the sake of convenience and simplicity, for the specific working processes of the foregoing systems, apparatuses, and units, reference can be made to the corresponding processes in the foregoing method implementations, which will not be repeated herein.

The above are merely specific implementations of the disclosure and are not intended to limit the scope of protection of the disclosure. Any modification and replacement made by those skilled in the art within the technical scope of the disclosure shall be included in the scope of protection of the disclosure. Therefore, the scope of protection of the disclosure should be stated in the scope of protection of the claims.

What is claimed is:

1. A method for terminal configuration, being applied to a network device and comprising:
   receiving, by the network device, at least two sets of communication capabilities reported by a terminal device in an initial access procedure of the terminal device;
   receiving, by the network device, capability indication information transmitted by the terminal device, the capability indication information indicating the network device to perform terminal configuration according to a first set of communication capabilities among the at least two sets of communication capabilities; and
   performing, by the network device, the terminal configuration according to the first set of communication capabilities;
   wherein the at least two sets of communication capabilities comprise a set of default communication capabilities, and the set of default communication capabilities are used for the network device to perform the terminal configuration according to the set of default communication capabilities on condition that the network device fails to receive the capability indication information.

2. The method of claim 1, wherein:
   the at least two sets of communication capabilities are in one-to-one correspondence with at least two operating states of the terminal device, and the first set of communication capabilities corresponds to a current operating state of the terminal device.

3. The method of claim 2, wherein the at least two operating states comprise at least two of:
   a single-band transmission and/or reception state, a multi-band simultaneous transmission and/or reception state, a single-operator-network access state, a multi-operator-network simultaneous access state, a high-speed moving state, or a low-speed moving state.

4. The method of claim 1, wherein:
   the at least two sets of communication capabilities comprise at least two sets of power class (PC) capabilities; and/or the at least two sets of communication capabilities comprise at least two sets of multiple input multiple output (MIMO) capabilities.

5. The method of claim 1, wherein:
   the terminal device comprises a multi-card terminal device.

6. The method of claim 1, further comprising:
   receiving, by the network device, first information transmitted by the terminal device, wherein the first information indicates the network device to update a communication capability of the terminal device.

7. A terminal device, comprising:
   a transceiver;
   a memory configured to store computer programs; and
   a processor configured to invoke and execute the computer programs stored in the memory to:
      report at least two sets of communication capabilities to a network device in an initial access procedure; and
      cause the transceiver to transmit capability indication information to the network device, the capability indication information indicating the network device to perform terminal configuration according to a first set of communication capabilities among the at least two sets of communication capabilities;
   wherein the at least two sets of communication capabilities comprise a set of default communication capabilities, and the set of default communication capabilities are used for the network device to perform the terminal configuration according to the set of default communication capabilities on condition that the network device fails to receive the capability indication information.

8. A network device, comprising:
   a transceiver;
   a memory configured to store computer programs; and
   a processor configured to invoke and execute the computer programs stored in the memory to:
      cause the transceiver to receive at least two sets of communication capabilities reported by a terminal device in an initial access procedure of the terminal device;
      cause the transceiver to receive capability indication information transmitted by the terminal device, the capability indication information indicating the network device to perform terminal configuration according to a first set of communication capabilities among the at least two sets of communication capabilities; and
      perform the terminal configuration according to the first set of communication capabilities;
   wherein the at least two sets of communication capabilities comprise a set of default communication capabilities, and the set of default communication capabilities are used for the network device to perform the terminal configuration according to the set of default communication capabilities on condition that the network device fails to receive the capability indication information.

9. The terminal device of claim 7, wherein:
   the at least two sets of communication capabilities are in one-to-one correspondence with at least two operating states of the terminal device, and the first set of communication capabilities corresponds to a current operating state of the terminal device.

10. The terminal device of claim 9, wherein the at least two operating states comprise at least two of:

a single-band transmission and/or reception state, a multi-band simultaneous transmission and/or reception state, a single-operator-network access state, a multi-operator-network simultaneous access state, a high-speed moving state, or a low-speed moving state.

11. The terminal device of claim 7, wherein:

the at least two sets of communication capabilities comprise at least two sets of power class (PC) capabilities; and/or the at least two sets of communication capabilities comprise at least two sets of multiple input multiple output (MIMO) capabilities.

12. The terminal device of claim 7, wherein:

the terminal device comprises a multi-card terminal device.

13. The network device of claim 8, wherein:

the at least two sets of communication capabilities are in one-to-one correspondence with at least two operating states of the terminal device, and the first set of communication capabilities corresponds to a current operating state of the terminal device.

14. The network device of claim 13, wherein the at least two operating states comprise at least two of:

a single-band transmission and/or reception state, a multi-band simultaneous transmission and/or reception state, a single-operator-network access state, a multi-operator-network simultaneous access state, a high-speed moving state, or a low-speed moving state.

15. The network device of claim 8, wherein:

the at least two sets of communication capabilities comprise at least two sets of power class (PC) capabilities; and/or the at least two sets of communication capabilities comprise at least two sets of multiple input multiple output (MIMO) capabilities.

16. The network device of claim 8, wherein:

the terminal device comprises a multi-card terminal device.

17. The network device of claim 8, wherein the processor is further configured to cause the transceiver to:

receive first information transmitted by the terminal device, wherein the first information indicates the network device to update a communication capability of the terminal device.

\* \* \* \* \*